US006730433B2

(12) United States Patent
Buckle et al.

(10) Patent No.: US 6,730,433 B2
(45) Date of Patent: May 4, 2004

(54) THIN-WALL ANODE CAN

(75) Inventors: Keith Edward Buckle, Southbury, CT (US); Mark Andrews, Peachtree City, GA (US); Thomas Takahura, Norco, CA (US)

(73) Assignee: The Gillette Company, Boston, MA (US)

( * ) Notice: Subject to any disclaimer, the term of this patent is extended or adjusted under 35 U.S.C. 154(b) by 162 days.

(21) Appl. No.: 10/051,837

(22) Filed: Jan. 16, 2002

(65) Prior Publication Data

US 2003/0134191 A1 Jul. 17, 2003

(51) Int. Cl.[7] .......................... H01M 2/02; B21D 11/10
(52) U.S. Cl. .................... 429/164; 429/176; 72/379.4; 72/715
(58) Field of Search ................. 429/164, 176; 29/623.1, 623.2; 72/338, 362, 379.2, 379.4, 715

(56) References Cited

U.S. PATENT DOCUMENTS

| 3,475,944 A | 11/1969 | Marshner ..................... 72/347 |
| 3,581,691 A | * 6/1971 | Ringler ........................ 72/338 |
| 4,051,707 A | 10/1977 | Valek et al. .................. 72/348 |
| 4,220,694 A | 9/1980 | Uetani et al. ................ 429/172 |
| 4,238,555 A | 12/1980 | Uetani et al. ................ 429/163 |
| 4,419,420 A | 12/1983 | Ishizaki ....................... 429/185 |
| 4,567,746 A | 2/1986 | Bachmann et al. ........... 72/348 |
| 5,072,605 A | 12/1991 | Imazu et al. .................. 72/46 |
| 5,088,870 A | 2/1992 | Fukuhara et al. ............. 413/4 |
| 5,576,117 A | 11/1996 | Morita et al. ............... 429/162 |
| 5,642,561 A | 7/1997 | Tuttle et al. ................ 29/623.2 |
| 5,919,586 A | 7/1999 | Springstead et al. ........ 429/164 |
| 5,945,230 A | 8/1999 | Oltman ........................ 429/27 |
| 5,968,682 A | * 10/1999 | Moriyama et al. .......... 429/176 |
| 6,060,194 A | 5/2000 | Lindner ...................... 429/174 |
| 6,066,184 A | 5/2000 | Brenner ..................... 29/623.2 |
| 6,089,072 A | * 7/2000 | Fields ......................... 72/379.4 |
| 6,402,794 B1 | * 6/2002 | Malay ........................ 29/623.2 |
| 6,447,947 B1 | * 9/2002 | Huq et al. .................. 429/176 |
| 6,485,863 B2 | * 11/2002 | Ohmura et al. ............. 429/176 |
| 6,526,799 B2 | * 3/2003 | Ferraro et al. ......... 72/379.4 X |

FOREIGN PATENT DOCUMENTS

| JP | 53-122732 | 10/1978 | ............ H01M/2/04 |
| JP | 57-95065 | 6/1982 | ............ H01M/2/04 |
| JP | 57-154760 | 9/1982 | ............ H01M/2/02 |
| JP | 57-182963 | 11/1982 | ............ H01M/2/04 |
| JP | 58-42168 | 11/1983 | ............ H01M/2/04 |
| JP | 59-8263 | 1/1984 | ............ H01M/2/04 |
| JP | 59-211957 | 11/1984 | ............ H01M/2/04 |
| JP | 60-41752 | 3/1985 | ............ H01M/2/02 |
| JP | 07-114908 | 5/1995 | ............ H01M/2/04 |
| JP | 09-129199 | 5/1997 | ............ H01M/2/04 |
| WO | WO 01/54858 A1 | 8/2001 | ........... B23P/11/00 |

* cited by examiner

Primary Examiner—Stephen J. Kalafut
(74) Attorney, Agent, or Firm—Paul I. Douglas

(57) ABSTRACT

A process is described for forming a can from extremely thin side wall material. The process includes the steps of reverse forming a portion of the can, and during the reverse forming process including a tapered side wall portion. Battery cans formed during the process are also described.

4 Claims, 7 Drawing Sheets

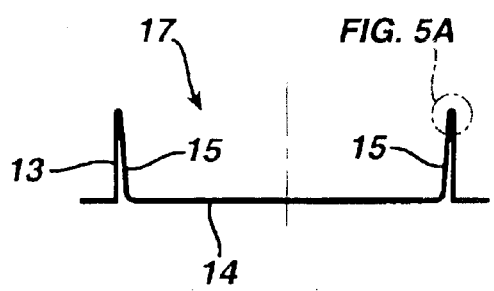
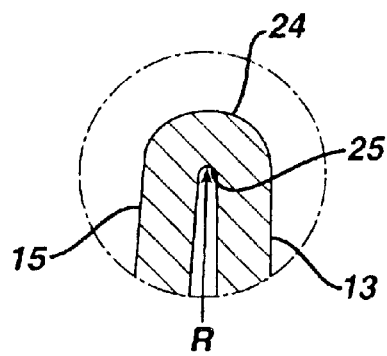
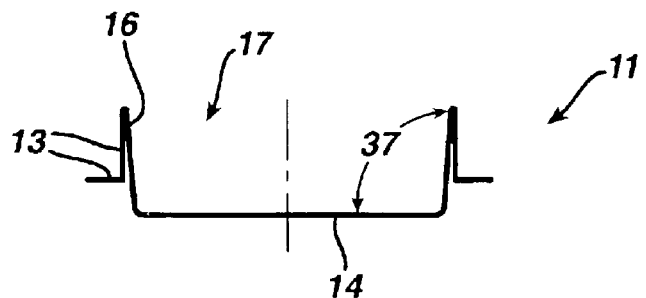
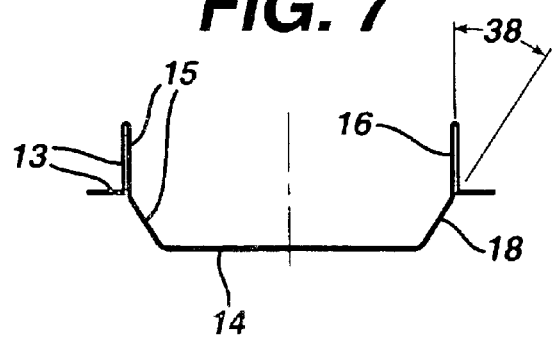

FIG. 8
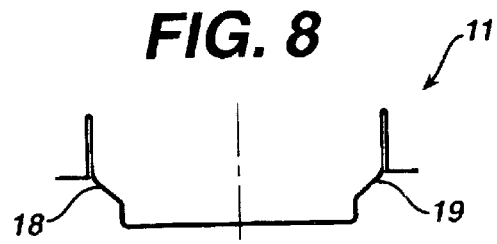
FIG. 9
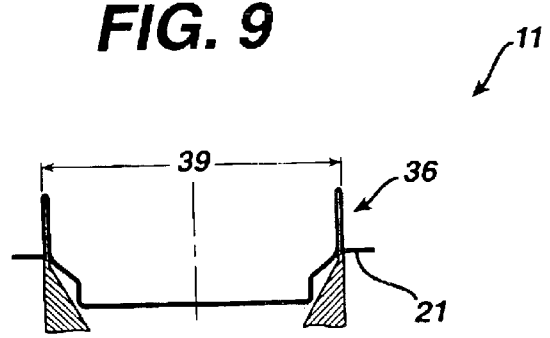
FIG. 10          FIG. 10A
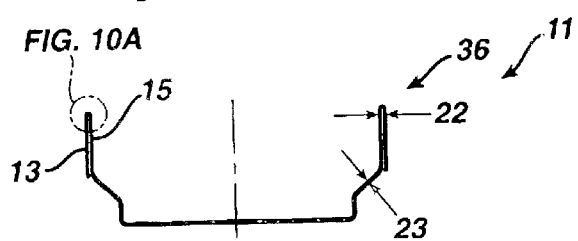    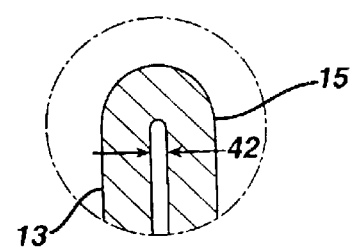

THIN-WALL ANODE CAN

BACKGROUND

This invention generally relates to forming a thin-walled can, such as a can for an electrochemical cell, or an anode can for a zinc air button cell.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

One example of a battery is a zinc air button cell. The container of a zinc air button cell includes an anode can and a cathode can; the anode can and the cathode can are crimped together to form the container for the cell. During use, oxygen, which is supplied to the cathode from the atmospheric air external to the cell, is reduced at the cathode, and zinc is oxidized at the anode.

It is often desirable to prepare cells using thin-walled anode cans, so additional active material can be added to the cell, so as to increase cell performance The current thickness of most anode can side walls used in current production is approximately 4 mils, i.e. 0.004 inch. It is desired to use even thinner anode can side walls so that the amount of active materials can be maximized within the interior of the zinc air button cell. A process and materials therefore need to be developed that allows thin sheets of anode can material to be stamped, shaped and formed to create anode can button cell side walls having a thickness from 0.0035 inch to less than one thousands of an inch.

SUMMARY OF THE INVENTION

A new method has been developed that allows the formation of cans having cylindrical wall and end (top) wall material thickness of 0.0035 inch, 0.0025 inch or 0.00010 inch or less thickness. A key discovery is the use of "slow forming" of the cylindrical wall by initially including a relatively large radius between the cylindrical wall and the reversed recessed interior walls, as the recessed interior walls are being formed. Sizing stages typically follow, which allows the distance between the reversed recessed interior walls and the outside cylindrical wall of the anode can to be gently decreased, preventing cracks in the extremely thin (and usually brittle) material. These cans may be used for battery components, such as anode cans for zinc air button cells.

Another aspect of the invention is the temporary formation of a tapered interior wall during the interior wall formation process, which is formed by use of a tapered punch.

In the forming process, the initial large radius is "slow formed", and the tapered interior wall is thereafter formed as the punch decreases the distance between the recessed interior wall and the outside cylindrical wall of the anode can.

This "slow forming" process results in lower residual stresses in the can side walls. This process will also allow the length of the recessed interior walls to be maximized. If these cans are used as anode cans in a zinc air battery, larger zinc air button cell sizes (13 & 675) can now be formed with thinner materials having thicknesses of 0.0035 inch and below, which was previously thought impossible.

This new can forming process also has the advantage of minimizing any potential damage (scratches, etc.) to the inner (copper) layer of the interior of the can, so as to reduce and/or eliminate any potential for gassing in a battery cell, if the can is used as an anode can for a button cell hearing aid battery.

In a preferred method of forming the particular (anode battery) can, the method can be seen to comprise the steps of forming a hollow can cylinder such that the hollow can cylinder consists of a cylindrical wall, and an end wall which closes one end of the cylindrical wall. A portion of this can cylinder is reverse drawn such that the end wall is displaced toward (and preferably through) the interior of the cylindrical wall to form a recess having recessed interior walls.

During this reverse drawing process, the "slow forming" method of the invention is practiced wherein an initial large radius is formed in a radiused side wall transition portion (FIG. 5), followed by the formation of the tapered interior wall section as mentioned previously.

After the formation of the recessed interior walls, the distance between portions of the recessed interior wall and the outer cylindrical wall are decreased. In a preferred embodiment, the recessed interior wall is urged toward the cylindrical wall, though it is well recognized that in alternative embodiments the cylindrical wall may be urged toward the interior wall or both walls may be moved toward one another. The distance between the walls may be decreased sufficiently so that the walls touch, either temporarily, or permanently.

A portion of the cylindrical wall may thereafter be trimmed away from the existing remaining portion of the cylindrical wall to leave a relatively smooth edge, if needed. During this trimming step, the can cylinder may be turned over prior to trimming the portion of the cylindrical wall.

The invention, of course, also includes any battery can(s) formed by use of this "slow forming" process. More specifically, the invention would cover a battery can having a side wall thickness of less than 0.0035 inch but greater than 0.0005 inches, after the material has been formed into the battery can.

More specifically, the invention would cover material having a side wall thickness of less than 0.003 inches but greater than 0.0005 inches. More specifically, the invention would cover material having a side wall thickness of less than 0.0025 but greater than 0.0005 inches. More specifically, the invention would cover material having a side wall thickness of less than 0.0025 inches to 0.001 inches.

The actual material used for the (anode battery) can can be that, for example, as described in co-pending U.S. patent application Ser. No. 09/878,748, filed Jun. 11, 2001 included in its entirety herein.

The details of one or more embodiments of the invention are set forth in the accompanying drawings and the description below. Other features, objects and advantages of the invention will be apparent from the description and drawings, and from the claims.

DESCRIPTION OF THE DRAWINGS

FIG. 5 is a side sectional view of the hollow can cylinder showing the first step in the "slow forming" process.

FIG. 5A is a side sectional view showing more detail of the radiused side wall transition portion.

FIG. 6 is a side sectional view of the hollow can cylinder showing the reversed recessed interior walls and tapered interior wall.

FIG. 7 is a side sectional view of the hollow can cylinder showing at least a portion of the recessed interior walls urged towards the outer cylindrical wall.

FIG. 8 is a side sectional view of the hollow can cylinder with a tapered portion of the cylindrical wall swaged inward.

FIG. 9 is side sectional view showing a trimming detail of the hollow can cylinder.

FIG. 10 is a side sectional view of a portion of the hollow can cylinder showing the recessed interior wall positioned adjacent a portion of the cylindrical wall, yielding a combined total thickness of both walls.

FIG. 10A is a side sectional view showing more detail of the walls of the hollow can cylinder.

DETAILED DESCRIPTION OF THE INVENTION

This invention generally relates to a method of forming an improved can for any particular system such as a primary alkaline battery, primary lithium battery, rechargeable battery, etc. In one embodiment of the invention, the method of forming the (anode battery) can is described with respect to a zinc air button cell. It should be well recognized that this method may be practiced to form cans for other battery systems as well. It should also be well recognized that this method may be practiced to form any thin wall can, for containing materials of any sort.

Figure 1:
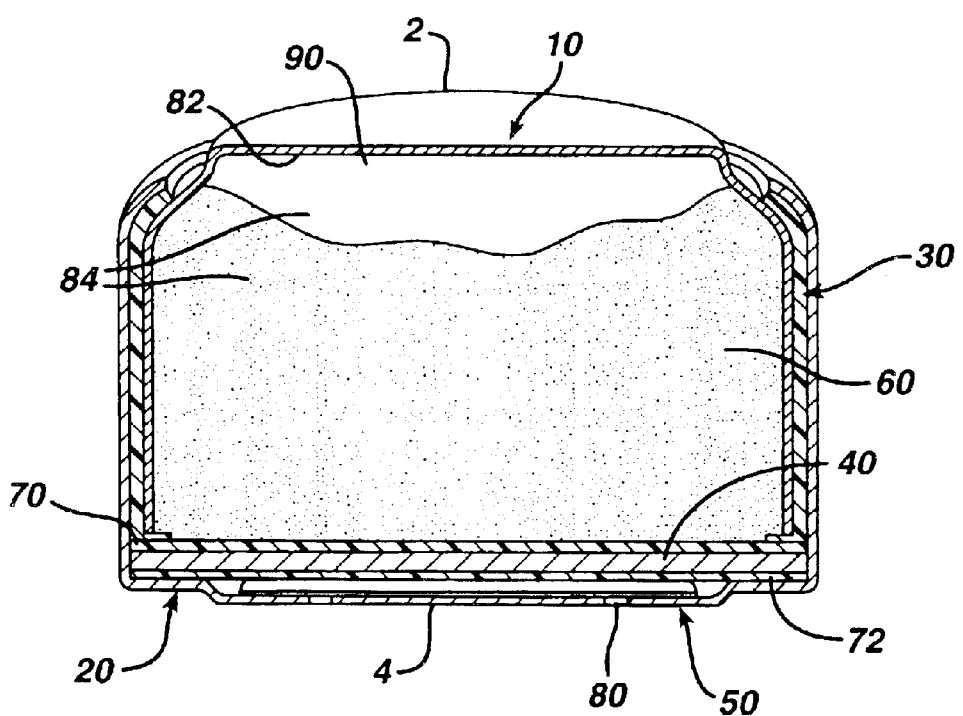
FIG. 1 is a side sectional view of a (prior art) button cell.

Referring to FIG. 1., a typical prior art button cell includes an anode side 2 and a cathode side 4. Anode 2 includes anode can 10 and anode gel 60. Cathode 4 includes cathode can 20 and cathode structure 40.

Insulator 30 is located between anode can 10 and cathode can 20. Separator 70 is located between cathode structure 40 and anode gel 60, preventing electrical contact between these two components. Membrane 72 helps prevent the electrolyte from leaking out of the cell. Air access port 80, located in cathode can 20, allows air to exchange into and out of the cell. Air disperser 50 is located between air access port 80 and cathode structure 40.

Anode can 10 and cathode can 20 are crimped together to form the cell container, which has an internal volume, or cell volume. Together, inner surface 82 of anode can 10 and separator 70 form anode volume 84. Anode volume 84 contains anode gel 60. The remainder of anode volume 84 is void volume 90.

The anode can may be made of a bi-clad material, a tri-clad material, or a multi-clad material. The bi-clad material is generally stainless steel with an inner surface of copper. The stainless steel provides strength, which is necessary to maintain structural integrity during battery manufacture. The stainless steel can be any stainless steel that can be formed into the proper shape for anode cans at high speeds. Generally, stainless steel that is available as a thin foil is used. For example, 304 stainless steel, as described in ASTM A167 can be used. Alternatively, SUS15-14 Stainless Steel, as described in the Japanese Institute of Standards, can be used. Generally, the layer of stainless steel makes up about 70 to about 90 percent of the total thickness of the anode can.

The copper layer provides a barrier between the stainless steel layer and the anode, and thus minimizes the formation of hydrogen gas. The copper can be pure copper. By "pure copper" is meant copper that fits the requirements described in ASTM F68. Generally, "pure copper" is at least 99.99% copper. For example, Ultrapure OFC grade copper, available from Hitachi Cable Ltd, Tokyo, Japan, can be used.

The anode can may also be made of tri-clad material. A can made of triclad material has a stainless steel layer with a copper layer on the inner surface of the can and a nickel layer on the outer surface of the can. The nickel provides an aesthetically pleasing outer surface. The layer of nickel generally takes up only a small proportion of the total thickness of the can. For example, the ratio of the combined thickness of the stainless steel and the copper to the thickness of the layer of nickel can be about 49:1. As is the case with the biclad material, the stainless steel usually makes up about 70–90% of the thickness of the can. In addition, the ratio of the thickness of the copper layer to the thickness of the stainless steel layer is at least 0.10:1.

The cathode can may be composed of cold-rolled steel having inner and outer layers of nickel. In one alternative embodiment, the cathode can may comprise Ni:SS304:Ni layers having a total thickness of 0.0025 inch. There is an insulator, such as an insulating gasket, that is pressure-fit between the anode can and cathode can. The gasket can be thinned to increase the capacity of the cell.

The anode can and the cathode can, together, form the cell container. Overall cell height and diameter dimensions for the cells are specified by the International Electrotechnical Commission (IEC). For example, a button cell can have a variety of sizes: a 675 cell (IEC designation "PR44") has a diameter between about 11.25 and 11.60 millimeters and a height between about 5.0 and 5.4 millimeters; a 13 cell (IEC designation "PR48") has a diameter between about 7.55 and 7.9 millimeters and a height between about 5.0 and 5.4 millimeters; a 312 cell (used as the example in FIGS. 2–8) (IEC designation "PR41") has a diameter between about 7.55 and 7.9 millimeters and a height of between about 3.3 and 3.6 millimeters; and a 10 cell (IEC designation "PR70") has a diameter between about 5.55 and 5.80 millimeters and a height between about 3.30 and 3.60 millimeters. A 5 cell has a diameter between about 5.55 and 5.80 millimeters and a height between about 2.03 and 2.16 millimeters.

The cathode structure has a side facing the anode gel and a side facing the air access ports. The side of the cathode structure facing the anode gel is covered by a separator. The separator can be a porous, electrically insulating polymer, such as polypropylene, that allows the electrolyte to contact the air cathode. The side of the cathode structure facing the air access ports is typically covered by a polytetrafluoroethylene (PTFE) membrane that can help prevent drying of the anode gel and leakage of electrolyte from the cell. Cells can also include an air disperser, or blotter material, between the PTFE membrane and the air access ports. The air disperser is a porous or fibrous material that helps maintain an air diffusion space between the PTFE membrane and the cathode can.

The cathode structure includes a current collector, such as a wire mesh, upon which is deposited a cathode mixture. The wire mesh makes electrical contact with the cathode can. The cathode mixture includes a catalyst for reducing oxygen, such as a manganese compound. The catalyst mixture is composed of a mixture of a binder (e.g., PTFE particles), carbon particles, and manganese compounds. The catalyst mixture can be prepared, for example, by heating manganese nitrate or by reducing potassium permanganate to produce manganese oxides, such as $Mn_2O_3$, $Mn_3O_4$, and $MnO_2$.

The catalyst mixture can include between about 15 and 45 percent polytetrafluoroethylene by weight. For example, the cathode structure can include about 40 percent PTFE, which can make the structure more moisture resistant, reducing the likelihood of electrolyte leakage from the cell. The cathode structure can have an air permeability without a separator and with one layer of PTFE film laminated on the screen of between about 300 and 600 sec/in$^2$, preferably about 400 sec/in$^2$, with 10 cubic centimeters of air. The air permeability can be measured using a Gurley Model 4150. The air permeability of the cathode structure can control venting of hydrogen gas in the cells, releasing the pressure, improving cell performance, and reducing leakage.

The anode is formed from an anode gel and an electrolyte. The anode gel contains a zinc material and a gelling agent. The zinc material can be a zinc alloy powder that includes less than 3 percent mercury, preferably no added mercury. The zinc material can be is alloyed with lead, indium, or aluminum. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Preferably, the zinc material can include lead, indium and aluminum, lead and indium, or lead and bismuth.

Alternatively, the zinc can include lead without other metal additives. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety. The zinc can be a powder. The particles of the zinc can be spherical or nonspherical. For example, the zinc particles can be acicular in shape (having an aspect ratio of at least two).

The zinc material includes a majority of particles having sizes between 60 mesh and 325 mesh. For example, the zinc material can have the following particle size distribution:

0–3 wt % on 60 mesh screen;

40–60 on 100 mesh screen;

30–50 wt % on 200 mesh screen;

0–3 wt % on 325 mesh screen; and

0–0.5 wt % on pan.

Suitable zinc materials include zinc available from Union Miniere (Overpelt, Belgium), Duracell (USA), Noranda (USA), Grillo (Germany), or Toho Zinc (Japan).

Zinc-air anode materials are loaded into a cell in the following manner. A gelling agent and zinc powder are mixed to form a dry anode blend. The blend is then dispensed into the anode can and the electrolyte is added to form the anode gel.

The gelling agent may be an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507,438.

In certain embodiments, the anode gel can include a non-ionic surfactant, and an indium or lead compound, such as indium hydroxide or lead acetate. The anode gel can include between about 50 and 500 ppm, preferably between 50 and 200 ppm, of the indium or lead compound. The surfactant can be a non-ionic phosphate surfactant, such as a non-ionic alkyl phosphate or a non-ionic aryl phosphate (e.g., PA600 or RM510, available from Rohm & Haas) coated on a zinc surface. The anode gel can include between about 20 and 100 ppm the surfactant coated onto the surface of the zinc material. The surfactant can serve as a gassing inhibitor.

The electrolyte can be an aqueous solution of potassium hydroxide. The electrolyte can include between about 30 and 40 percent, preferably between 35 and 40 of potassium hydroxide. The electrolyte can also include between about 1 and 2 percent of zinc oxide.

During storage, the air access ports are typically covered by a removable sheet, commonly known as the seal tab, that is provided on the bottom of the cathode can to cover the air access ports to restrict the flow of air between the interior and exterior of the button cell. The user peels the seal tab from the cathode can prior to use to allow oxygen from air to enter the interior of the button cell from the external environment.

Figure 2:
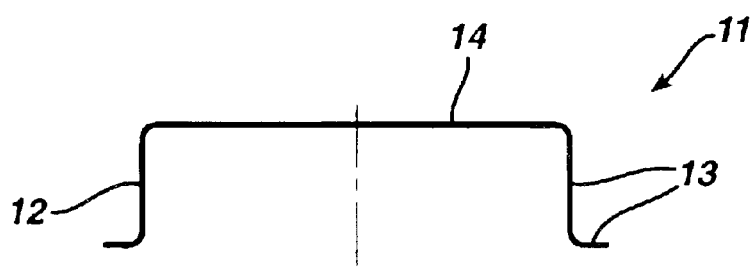
FIG. 2 is a side sectional view of a hollow can cylinder initially formed from a flat sheet of (battery) can material.

Referring now to FIG. 2, a hollow can cylinder 11 of the present invention is shown partially formed, using battery can material 12 which typically has (in one embodiment) a side wall thickness 23 (See FIG. 10) from 0.0035 inches down to 0.0005 inches. Such material can be either the biclad or the triclad anode can material mentioned previously or any other material used to form battery cans. The invention is not affected by the particular ratios of the layered materials typically used to form the battery can material, i.e. it is not limited to a certain ratio of copper to stainless steel thickness for example.

The hollow can cylinder 11 can be seen to include a cylindrical wall 13 and an end wall 14. The hollow can cylinder 11 is shown being formed in the initial stages of a forming operation to be described further in reference to the following FIGS. 3–11.

Figure 3:
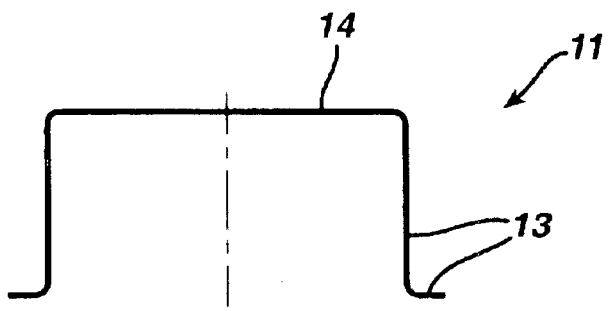
FIG. 3 is a side sectional view of a hollow can cylinder with additional height added to the cylindrical wall.

Referring now to FIG. 3, the cylindrical wall 13 of the hollow can cylinder 11 has been increased in height, such as by another drawing operation.

Figure 4:
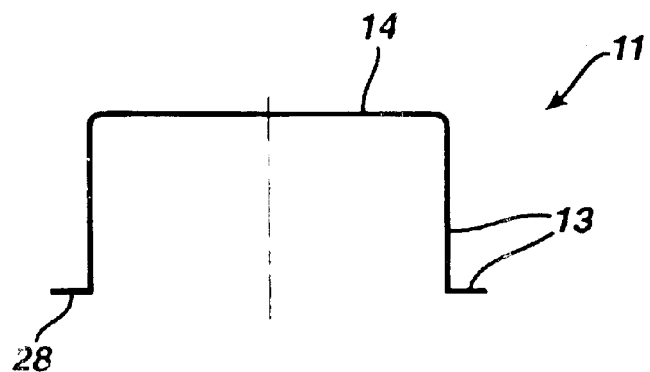
FIG. 4 is a side sectional view of a hollow can cylinder with a height reduced slightly.

Referring now to FIG. 4, the overall height of the hollow can cylinder has been reduced slightly in order to form a sharp edge 28 in a portion of the cylindrical wall 13. It is necessary to have this sharp edge 28 to prevent wrinkling of the cylindrical wall 13, at least in the Example discussed later related to the size 312 anode can.

Referring now to FIG. 5 and FIG. 5A, a punch (not shown) is used to form a radiused side wall transition portion 24 between the recessed interior wall 15 and cylindrical wall 13. In the Example discussed later, end wall 14 is fully reversed down through cylindrical wall 15 when going from the hollow can cylinder 11 shown in FIG. 4, to that shown in FIGS. 5 and 5A. In other words, in transitioning from FIG. 4 to FIG. 5, it can be seen that a portion of that hollow can cylinder 11 has been reverse drawn such that the end wall 14 is displaced toward and preferably through the interior of the cylindrical wall 13 to form a recess 17 having recessed interior walls 15. The radius 25 of this transition portion varies as the end wall 14 is reverse drawn to form recess 17. This radius 25 is not formed instantaneously, (such as by a later roll forming process step wherein the outer cylindrical wall is moved toward the inner wall, in the area of the desired radius 25, to form a "swelled" flange) but instead is "slow-formed" as the end wall 14 travels downward and is reverse drawn downward to eventually form a portion of recess 17.

Referring now to FIG. 6, tapered interior wall 16 thereafter forms a portion of the recessed interior walls 15. It is important to have this tapered interior wall 16 included in this stage of the process in order to prevent cracking of the extremely thin metal during the formation of the battery can 36 (FIG. 9), or during the battery assembling process. This taper is indicated by taper angle 37. In one embodiment discussed in the example below, the tapered interior wall 16 only spans 1.51/2.57 or 58% of the vertical height of the recessed interior walls. (Reference the dimensions in FIG. 11E.) During the formation of this wall 16, the radiused side wall transition portion 24 converts into at least a portion of tapered interior wall 16, as seen in FIG. 6.

Referring again to FIG. 6 (and also FIG. 7), the tapered interior wall portion 16 has been urged outward to be positioned adjacent, or to be in contact with the cylindrical wall 13. It should be well understood that in an alternative embodiment, the outer cylindrical wall 13 may be moved inward to contact the tapered wall portion 16, or both portions may be urged toward each other to be positioned adjacent, or to be in contact with each other. The walls may initially contact each other, and then spring back from each other, due to the residual stresses remaining in the part. In any event, the distance between the walls 13, 16 is decreased, and in some embodiments may be eliminated entirely, at least along a portion of the wall(s) 13, 16.

Referring now to FIG. 7, a tapered portion 18 has also been formed at the lower portion of the recessed interior wall 15 and the outer cylindrical wall 13. This tapered portion has a tapered portion angle 38 of 32.220 in the Example given below (see FIG. 11-F).

Referring to FIG. 8, it can be seen that a swaged portion 19 has now been formed in a portion of the tapered portion 18.

Referring to FIG. 9, it can be seen that a cut cylindrical wall portion 21 may be cut from the remaining portion of the cylindrical wall 13 of the battery can 36. Battery can 36 also includes desired outer diameter 39.

Referring to FIG. 10 and FIG. 10A, a battery can 36 is shown having a portion of a recessed interior wall 15 positioned adjacent a portion of a cylindrical wall 13, the combined total thickness 22 of both walls (when measured horizontally across a portion of said portion of said recessed interior wall 15 and said adjacent portion of said cylindrical wall 13) being from less than 0.008 to greater than 0.001 inches. The combined total thickness 22 of both portions of both walls 13, 15 will, of course, depend on the thickness of the starting material, as well as any gap 42 that may exist between walls 13, 15, yielding battery cans having side wall total thickness' 22 of less than 0.008 inch to greater than 0.002 inch, or from less than 0.007 to greater than 0.002 inch, or from less than 0.005 to greater than 0.002 inch, or from less than 0.005 to greater than 0.003 inch. (In the Example given below, using material having a nominal thickness of 0.0025", a gap of 0.001 inch was measured. This gap may only be present adjacent to the intersection of walls 13,15, or may extend further downwardly.)

These total thicknesses 22 result from using material having a side wall thickness 23 of less than 0.0035 inch, but greater than 0.0005 inch. The side wall thickness 23 of the anode battery can material can of course be in other ranges, such as from less than 0.003 inch to greater than 0.0005 inch, or from less than 0.025 inch to greater than 0.0005 inch, or from less than 0.00025 inch to greater than 0.001 inch, as mentioned previously.

As shown in FIG. 10, the side wall thickness 23 is the measured thickness in the material after it has been subjected to the forming process. It is suspected that the side wall thickness 23 may change very slightly during the forming process from that of the original thickness of the biclad or triclad sheet. In the Example given below, no changes in the original thicknesses were detected, a favorable result given the extreme thinness of the material being used. If the process steps did cause the material to thin further, the risk of failed parts would increase, perhaps dramatically.

EXAMPLE

Referring now to FIGS. 11A through 11I, in one embodiment of the invention, a "312"-size anode cell for a hearing aid zinc-air button cell is formed using the process of the instant invention. The dimension of the triclad material's side wall thickness 23 used in this process (the process steps being shown in FIGS. 2–9) is 0.0025 inch or slightly larger than 0.06 mm. This tri-clad material is available from Sumitomo Special Metals, Suita-Shi Osaka Japan 564-0043 and is designated 16:82:2 (copper; stainless steel 15-14; nickel) triclad with a tensile strength of 65 to 71 kilograms per square millimeter, a yield strength of 57 to 60 kilograms per square millimeter, a percent elongation of 28 to 30% and a hardness of the stainless steel layer of 254. The dimensions shown in FIG. 11 are related to the formation of a 312-size anode battery can, and are given in millimeters.

Figure 11A:
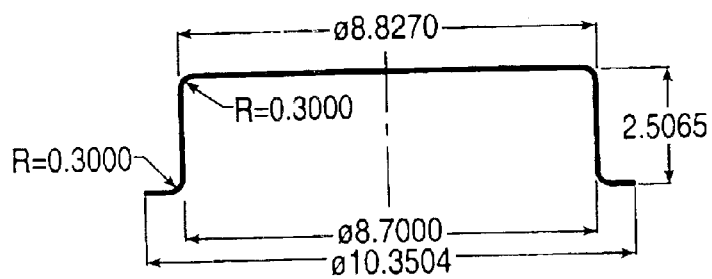
FIGS. 11A–I are graphical representations of the dimensions of a zinc air cell size 312 anode can as it is formed according to the process shown in FIGS. 2–9.
Figure 11B:
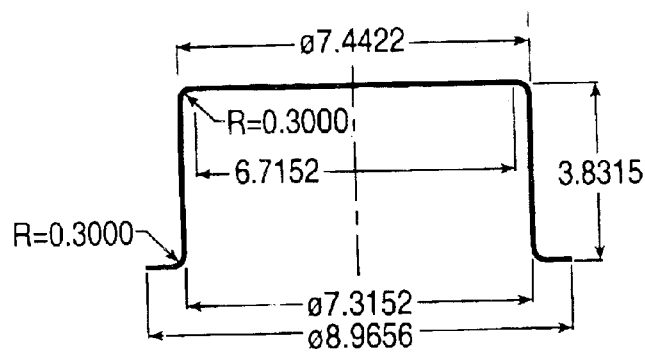
Figure 11C:
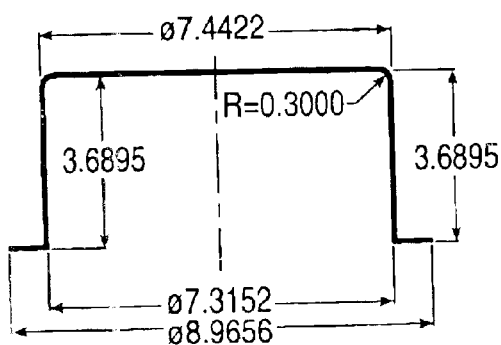
Figure 11D:
Figure 11E:
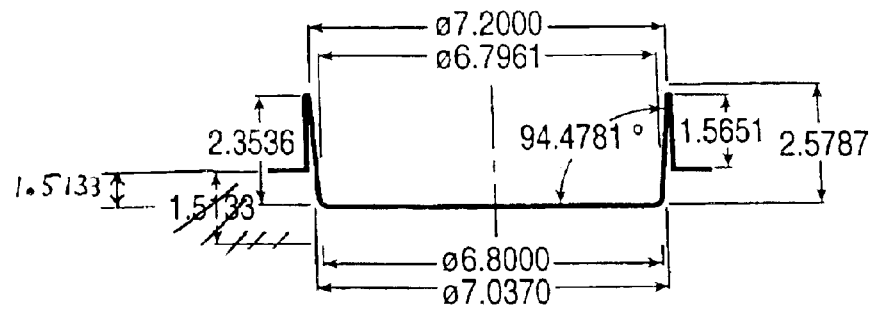
Figure 11F:
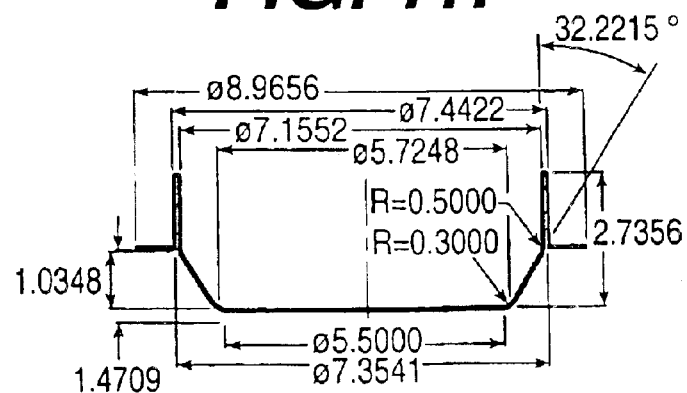
Figure 11G:
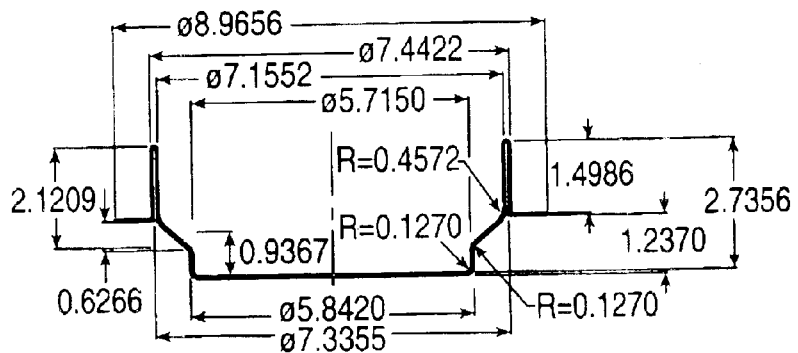
Figure 11H:
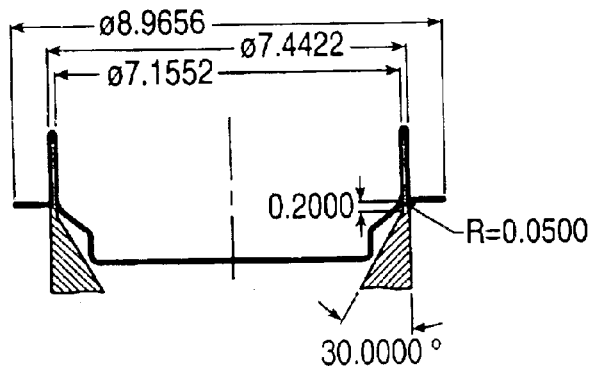
Figure 11I:
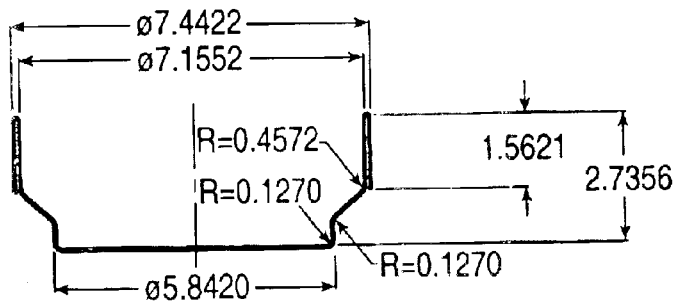

During the forming process of the radiused side wall transition portion (as shown in FIGS. 11D and 11E), cross sections were taken of actual 312 size anode cans, at various degrees of crankshaft rotation of the punch, as follows:

Radius 0.080 mm@150 degree
Radius 0.062 mm@155 degree
Radius 0.050 mm@160 degree
Radius 0.032 mm@165 degree
Radius 0.028 mm@170 degree
Radius 0.024 mm@175 degree
Radius 0.020 mm@180 degree At 180 degrees of crankshaft rotation, the punch was at bottom dead center of crankshaft rotational arc. The ratio of the radius 25 to the side wall thickness 23 is approximately 0.020 mm/0.060 mm or 33%, which is indicative of a very small radius coupled with very thin material.

All publication patents and patent applications mentioned in this application are herein incorporated by reference to the same extent as if each individual publication, patent, or patent application was specifically and individually indicated to be incorporated by reference.

OTHER EMBODIMENTS

A number of embodiments of the invention have been described. Nevertheless, it will be understood the various modifications may be made without parting from the spirit and scope of the invention. Accordingly, other embodiments are within the scope of the following claims.

What is claimed is:

1. A battery can formed from material having side wall thickness of less than 0.0035 inches, but greater than 0.0005 inches, said can having a radiused side wall transition portion formed in a portion of said side wall, said radiused side wall transition portion having a radius of less than 0.024 mm but greater than 0.020 mm during the forming of said side wall.

2. A battery can formed from material having side wall thickness of less than 0.0035 inches, but greater than 0.0005 inches, said can having a radiused side wall transition portion formed in a portion of said side wall, said radiused side wall transition portion having a radius of less than 0.024 mm but greater than 0.020 mm during the forming of said side wall; wherein the ratio of said radius to the side wall thickness is approximately 33%.

3. A method of forming a battery can, said method comprising the steps of forming a hollow can, cylinder having a cylindrical wall of thickness between about 0.0005 and 0.0035 inches and an end wall closing one end of the cylindrical wall, reverse drawing a portion of the hollow can cylinder such that the end wall is displaced toward, the interior of the cylindrical wall to form a recess having recessed interior walls, and decreasing the distance between a portion of said recessed interior walls and a portion of said cylindrical wall of said hollow can cylinder; wherein prior to reverse drawing a portion of the hollow can cylinder said method further comprises forming a flat sharp edge surface in a portion of the cylindrical wall, said flat edge surface being at an angle about perpendicular to said cylindrical wall.

4. A method of forming a battery can, said method comprising the steps of forming a hollow can cylinder having a cylindrical wall of thickness between about 0.0005 and 0.0035 inches and an end wall closing one end of the cylindrical wall, reverse drawing a portion of the hollow can cylinder such that the end wall is displaced toward the interior of the cylindrical wall to form a recess having recessed interior walls, and decreasing the distance between a portion of said recessed interior walls and a portion of said cylindrical wall of said hollow can cylinder so that at least a portion of said recessed wall contacts said cylindrical wall; wherein prior to reverse drawing a portion of the hollow can cylinder said method further comprises forming a flat sharp edge surface in a portion of the cylindrical wall, said flat edge surface being at an angle about perpendicular to said cylindrical wall; wherein said method further comprises the step of trimming a portion of said flat sharp edge surface from said cylindrical wall after decreasing the distance between a portion of said recessed interior walls and a portion of said cylindrical wall of said hollow can cylinder.

* * * * *

UNITED STATES PATENT AND TRADEMARK OFFICE
CERTIFICATE OF CORRECTION

PATENT NO. : 6,730,433 B2
DATED : May 4, 2004
INVENTOR(S) : Keith Edward Buckle, Mark Andrews and Thomas Takakura It is certified that error appears in the above-identified patent and that said Letters Patent is hereby corrected as shown below:

Title page,
Item [75], Inventors, "Thomas Takahura" should read -- Thomas Takakura --.

Signed and Sealed this

Twenty-first Day of December, 2004

JON W. DUDAS
*Director of the United States Patent and Trademark Office*